United States Patent
Hassanzadeh et al.

(10) Patent No.: US 11,531,717 B2
(45) Date of Patent: *Dec. 20, 2022

(54) DISCOVERY OF LINKAGE POINTS BETWEEN DATA SOURCES

(71) Applicant: INTERNATIONAL BUSINESS MACHINES CORPORATION, Armonk, NY (US)

(72) Inventors: Oktie Hassanzadeh, Briarcliff Manor, NY (US); Mauricio A. Hernandez-Sherrington, Gilroy, CA (US); Ching-Tien Ho, San Jose, CA (US); Lucian Popa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 336 days.

This patent is subject to a terminal disclaimer.

(21) Appl. No.: 16/794,895

(22) Filed: Feb. 19, 2020

(65) Prior Publication Data

US 2020/0183995 A1    Jun. 11, 2020

Related U.S. Application Data

(63) Continuation of application No. 15/440,372, filed on Feb. 23, 2017, now Pat. No. 10,599,732, which is a
(Continued)

(51) Int. Cl.
*G06F 16/9535* (2019.01)
*G06F 16/25* (2019.01)
(Continued)

(52) U.S. Cl.
CPC .... *G06F 16/9535* (2019.01); *G06F 16/24578* (2019.01); *G06F 16/258* (2019.01); *G06F 16/273* (2019.01)

(58) Field of Classification Search
CPC .......... G06F 16/9535; G06F 16/24578; G06F 16/258; G06F 16/273; G06F 16/9536; G06F 16/27
See application file for complete search history.

(56) References Cited

U.S. PATENT DOCUMENTS 6,523,019 B1   2/2003   Borthwick
6,826,568 B2   11/2004  Bernstein
(Continued)

OTHER PUBLICATIONS

Kamel et al., Empirical aspects of record linkage across multiple data sets using statistical linkage keys: the experience of the PIAC cohort study, BMC Health Services Research 2010, 10:41, pp. 1-13. (Year: 2010).*

(Continued)

*Primary Examiner* — Cheyne D Ly
(74) *Attorney, Agent, or Firm* — Michael O'Keefe

(57) ABSTRACT

Data records are linked across a plurality of datasets. Each dataset contains at least one data record, and each data record is associated with an entity and includes one or more attributes of that entity and a value for each attribute. Values associated with attributes are compared across datasets, and matching attributes having values that satisfy a predetermined similarity threshold are identified. In addition, linkage points between pairs of datasets are identified. Each linkage point links one or more pairs of data records. Each data record in the pair of data records is contained in one of a given pair of datasets, and each pair of data records is associated with a common entity having matching attributes in the given pair of datasets. Data records associated with the common entities are linked across datasets using the identified linkage points.

9 Claims, 2 Drawing Sheets

Related U.S. Application Data continuation of application No. 13/888,702, filed on May 7, 2013, now Pat. No. 9,710,534.

(51) Int. Cl.
  *G06F 16/27* (2019.01)
  *G06F 16/2457* (2019.01)

(56) References Cited

U.S. PATENT DOCUMENTS

| | | | |
|---|---|---|---|
| 7,444,330 B2 | 10/2008 | Bernstein | |
| 8,082,243 B2 | 12/2011 | Gorelik | |
| 9,317,544 B2 | 4/2016 | Ganjam | |
| 9,710,534 B2 | 7/2017 | Hassanzadeh | |
| 2002/0073099 A1 | 6/2002 | Gilbert | |
| 2002/0178394 A1* | 11/2002 | Bamberger | G06F 11/006 707/999.001 |
| 2006/0178954 A1 | 8/2006 | Thukral | |
| 2006/0179050 A1 | 8/2006 | Giang | |
| 2007/0276858 A1 | 11/2007 | Cushman, II | |
| 2010/0094853 A1* | 4/2010 | Telloli | G06F 16/951 707/706 |
| 2010/0131516 A1 | 5/2010 | Jean-Mary | |
| 2010/0161616 A1* | 6/2010 | Mitchell | G06F 16/31 707/741 |
| 2010/0169118 A1 | 7/2010 | Rottsolk | |
| 2010/0228794 A1* | 9/2010 | Roy | G06F 16/367 707/E17.069 |
| 2011/0131253 A1 | 6/2011 | Peukert | |
| 2012/0078913 A1 | 3/2012 | Muni | |
| 2012/0203586 A1 | 8/2012 | Blakely | |
| 2013/0325881 A1 | 12/2013 | Deshpande | |
| 2015/0199363 A1* | 7/2015 | Morton | G06F 16/2455 707/722 |
| 2017/0161396 A1 | 6/2017 | Hassanzadeh | |

OTHER PUBLICATIONS

Yakout et al. Efficient Private Record Linkage, IEEE International Conference on Data Engineering, pp. 1283-1286. (Year: 2009).*
Schnell et al., Privacy-preserving record linkage using Bloom filters, BMC Medical Informatics and Decision Making, pp. 1-11. (Year: 2009).*
Aizawa et al., A Fast Linkage Detection Scheme for Multi-Source Information Integration, Proceedings of the 2005 International Workshop on Challenges in Web Information Retrieval and Integration (WIRI'05), pp. 1-10. (Year: 2005).*
U.S. Appl. 16/794,895, filed Feb. 19, 2020.
U.S. Appl. 15/440,372, filed Feb. 23, 2017, US 2017-0161396 A1.
U.S. Appl. 13/888,702, filed May 7, 2013, U.S. Pat. No. 9,710,534.
IBM: List of IBM Patents or Patent Applications Treated as Related (Appendix P), Mar. 11, 2020, pp. 1-2.
B.T. Dai, "Validating Multi-Column Schema Matchings by Type", In IEEE Proc. of the Int'l Conf. on Data Eng., pp. 120,2008.
Bauckmann et al., "Efficiently detecting inclusion dependencies", ICDE, 2007, pp. 1448-1450.
De Pauw et al., "Discovering Conversations in Web Services Using Semantic Correlation Analysis", (ICWS), Jun. 2007, 39-646. IEEE.
Demarchi and Petit, "Zigzag: a new algorithm for mining large inclusion dependencies in databases", ICDM, 2003, p. 27-34.
Doan et al. , "Learning to Match the Schemas of Data Sources: A Multistrategy Approach", Machine Learning 50(3): 279-301, 2003.
E. Durham, "A Framework for Accurate, Efficient Private Record", Linkage, May 2012, pp. 1-214.
E. Rahm et al., "A Survey of Approaches to Automatic Schema Matching", The Int'l Journal on Very Large Data Bases, 10(4):334-350, Nov. 21, 2001.
Giundchiglia et al., "S-Match: an open source framework for matching lightweight ontologies", Semantic Web—Interoperability, Usability, Applicability, IOS Press 2011.
Isele and Bizer, "Learning Linkage Rules using Genetic Programming", ISWC'11 Workshop on Ontology Matching, 2011.
Kang and Naughton, "On Schema Matching with Opaque Column Names and Data Values", In ACM SIGMOD Int'l Conf. on Mgmt. of Data, 2003.
Larson et al., "A Theory of Attribute Equivalence in Databases with Application to Schema Integration", IEEE Transactions on Software Engineering, Apr. 1989, vol. 15, No. 4.
Llyas et al., "CORDS: Automatic discovery of correlations and soft functional dependencies", SIGMOD 2004, Jun. 13-18, 2004, Paris, France.
Nezhad et al., "Event Correlation for Process Discovery from Web Service Interaction Logs", VLDB Journal, 2010.
Ngonga Ngomo, "RAVEN—Active Learning of Link Specifications", ISWC'11 Workshop on Ontology Matching, 2011.
Rostin et al., "A machine learning approach to foreign key discovery", WebDB, 2009.
Rozsnyai et al., "Discovering event correlation rules for semi-structured business processes", Proceedings of the Fifth ACM International Conference on Distributed Event-Based Systems, DEBS 2011: 75-86.
Sismanis et al., "GORDIAN: Efficient and Scalable Discovery of Composite Keys", VLDB 2006: 691-702.
Yakout et al., "Efficient Private Record Linkage", IEEE International Conference on Data Engineering, 2009, pp. 1283-1286.
Zhang et al., "On Multi-Column Foreign Key Discovery". PVLDB 3(1): 805-814, 2010.

* cited by examiner

DISCOVERY OF LINKAGE POINTS BETWEEN DATA SOURCES

CROSS-REFERENCE TO RELATED APPLICATIONS

The present application is a continuation of U.S. patent application Ser. No. 13/888,702 filed May 7, 2013. The entire disclosure of this application is incorporated herein by reference.

FIELD OF THE INVENTION

The present invention relates to data management.

BACKGROUND OF THE INVENTION

Many increasingly important data management and mining tasks require integration and reconciliation or fusion of data that reside in multiple large and heterogeneous data sources. Data integration is generally defined as combining data that reside in different sources and providing users with a unified view of the data. In data fusion, duplicates are merged and conflicting attributes values are identified and possibly repaired in order to provide a single consistent value for each data attribute. Data fusion, therefore, involves duplicate detection, also known as Entity Resolution or record linkage, where the goal is to identify data records that refer to the same entity.

The first step in a data integration or fusion system is identification of "linkage points" between the data sources, i.e., finding correspondences between the attributes in the data sources that can be used to link their records or entities. Traditionally, this is performed by schema matching, where the goal is to identify the schema elements of the input data sources that are semantically related. However, the massive growth in the amount of unstructured and semi-structured data in data warehouses and on the Web has created new challenges for this task. With the increasing size and heterogeneity of data sources, the task can no longer be performed manually using simple user interfaces or with specific heuristics that work well only for a certain type of data or domain. In addition, the noise and error present in data extracted from text documents or large legacy repositories make the task even more challenging.

SUMMARY OF THE INVENTION

Exemplary embodiments of systems and methods in accordance with the present invention provide for the discovery of attributes in large heterogeneous and semi-structured data sources or databases that can be used to link records or entities across the databases. The solution is a framework that takes in as input semi-structured data sets. Each semi-structured data set describes a set of entities of the same type, e.g., companies or people. The framework returns as output a ranked list of pair of attributes from the input sources that can be used to link their records. The framework includes a data registry component to register input data sets, a data loading component that transform the input data into a set of record-attribute-value triples, an indexing component that transforms the input values using an analyzer function and builds efficient reverse indices and a set of search algorithms that perform a search for linkage points using a similarity function that measures the similarity of the transformed/analyzed value sets. A set of filtering criteria that filters false positives from the output of search algorithms is also used.

DETAILED DESCRIPTION

Figure 1:
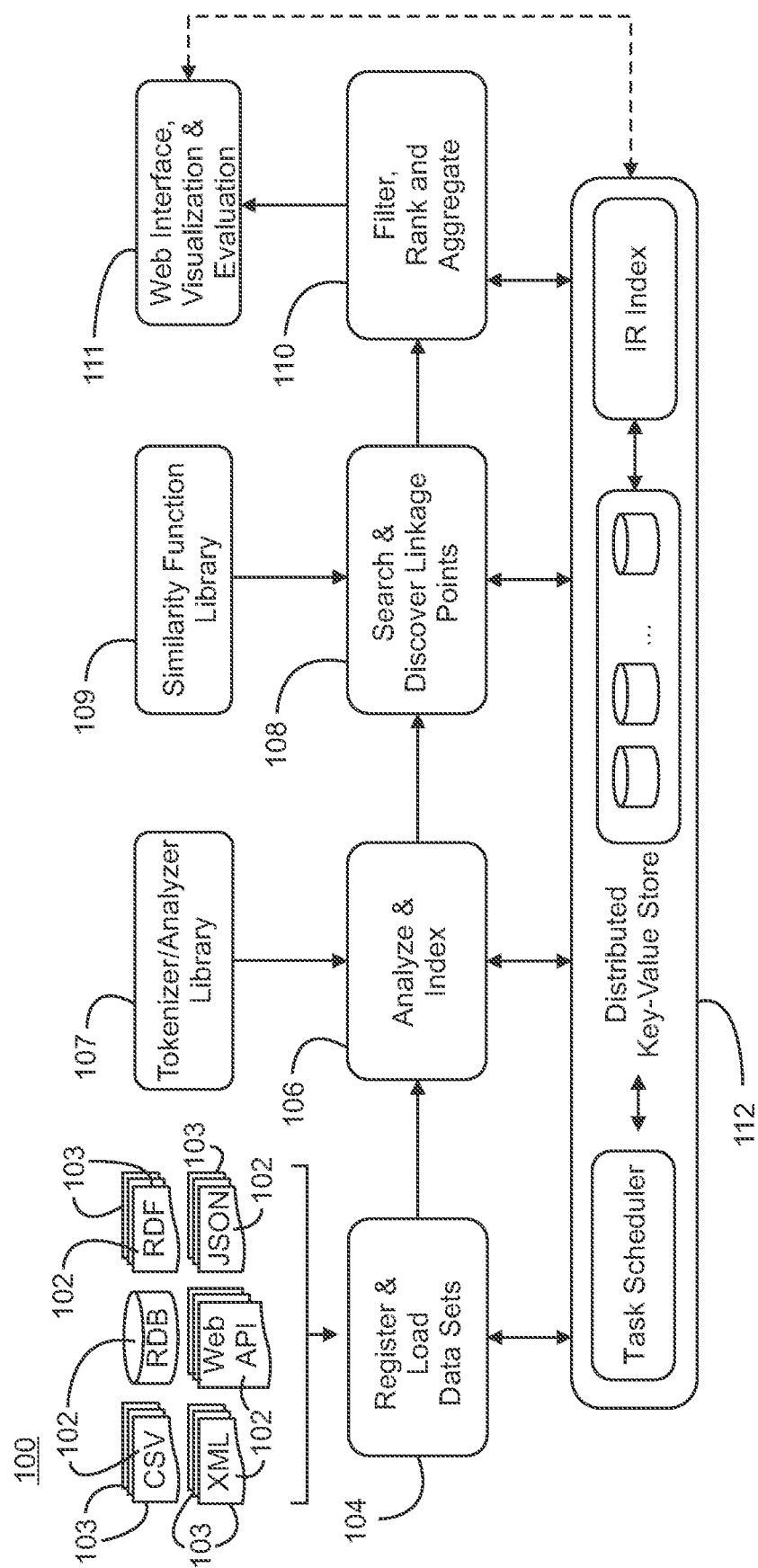
FIG. 1 is a schematic representation of an embodiment of a system for linking data records across datasets in accordance with the present invention.

Referring to FIG. 1, an exemplary embodiment of a system or framework 100 for lining data records across datasets in accordance with the present invention is illustrated. The system includes a plurality of different datasets 102. The datasets can be of different types and formats, e.g., comma separated value datasets, relational databases stored in relational database management systems, resource description framework databases, extensible markup languages databases, web application programming interface databases and JavaScript object notation databases. In general, these databases contain one or more data records 103 associated with entities, i.e., real-world entities. These real-world entities include, but are not limited to, businesses, individual persons, corporations, government entities, non-profit organizations, religious organizations, schools, colleges, universities, sports teams, historical figures, literary works, and geographical data. Any entity or topic for which data can be gathered, stored and analyzed can be stored in a database and in a format that can be linked using the current invention.

Each data record in a given database is associated with a real-world entity and includes data about that real-world entity. As the same real-world entity can have data records in more than one database or related real-world entities can have data records in more than one database, the present invention provides for the linking of data records across databases that are associated with a common or related entity. Each data record in each database contains attributes and each attribute has an associated value or values. These attributes are, for example, names, dates, locations, or other descriptive information regarding the entity associated with a given data record. The values are character strings of information that include alpha-numeric characters, non-alphanumeric characters and spaces, e.g., 100 East Main Street.

The system includes a registration and loading module 104 that is in communication with the datasets. An analysis and indexing module 106 is in communication with the loading module and receives data records from the loading module. The data records are labeled and analyzed for attributes and values. These attributes and values for each data record are placed into a desired format, i.e., label, attribute and value triples. The analysis and indexing module is in communication with a tokenizer and analyzer library 107 and uses the module to analyze and tokenize each value in each triple. Each string of characters is analyzed and broken into a set containing a plurality of tokens, which can be individual characters or sub-strings of characters, e.g., {101, East, Main, Street}.

A linkage point discovery module 108 is provided that can identify linkage points between data records across datasets. Each linkage point can be used to link data records in each of two data sets that are associated with the same real-world entity or related real-world entities as determined through a comparison of the token sets associated with attributes in each one of the two data records. Therefore, the linkage point discovery module 108 is in communication with a similarity function library 109, and uses one or more of the similarity functions contained in that library to identify pairs of token sets that meet a predetermined similarity threshold based on a comparison of the tokens in those token sets.

A filtering module 110 is included in the system that is used to eliminate false positives in the identified linage points. The module can also rank the identified linkage points by strength or group. Common occurrences of linkage points can be grouped together or linkage points can be aggregated together to identify linkage points, i.e., data records for common entities or related entities, across three or more datasets. All of these modules can run on one or more computing systems, e.g., a distributed or cloud based computing system, and can include other components 112 to support the running of the linkage point identification modules. These other components include one or more data bases to store data required or generated during the linkage point identification process, a task scheduler and an information retrieval index. An interface 111 such as a visual interface, a graphical user interface or a Web-based interface is provided in communication with the linkage point identification system to communicate and to visualize the results of the data records linkage evaluation and linkage point identification.

Figure 2:
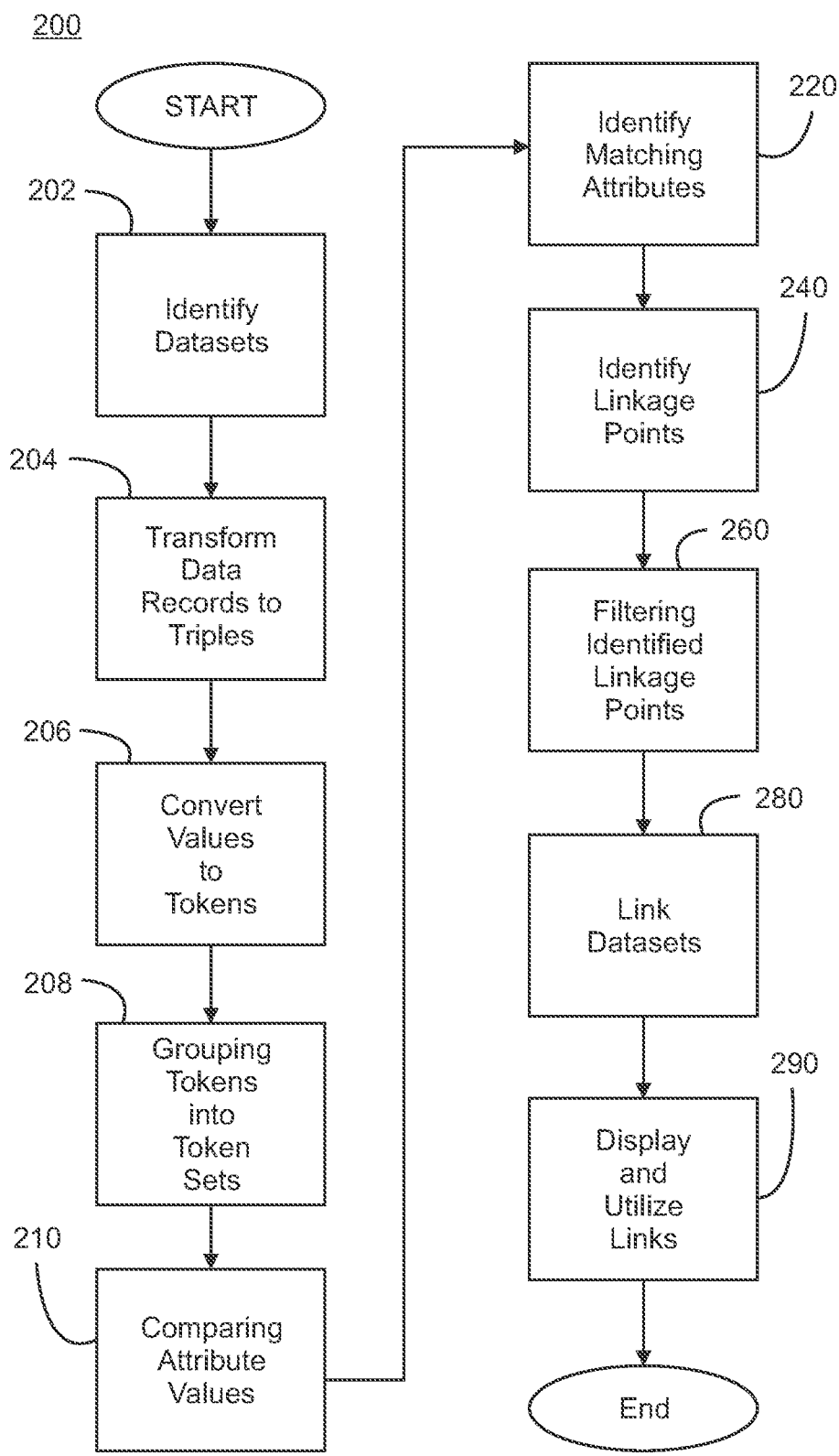
FIG. 2 is a flow chart illustrating an embodiment of method for linking data records across data sets in accordance with the present invention.

Referring to FIG. 2, an exemplary embodiment for linking data records across datasets 200 in accordance with the present invention is illustrated. A plurality of datasets is identified 202 that contain data records that are to be linked by association with a common entity or related entities. Each dataset contains at least one data record, and each data record is associated with an entity, i.e., real world entity, and includes one or more attributes of that entity and a value associated with each attribute. A given attribute in a given data record can have more than one occurrence within that data record or more than one value within that data record, e.g. multiple physical addresses.

The data records in each identified dataset are transformed into one or more data record triples 204. Each data record triple for a given data record contains an identification, i.e., label, of a given record, a given attribute within that data record and a value for the given attribute. This identification for the given record or label is an alpha-numeric designation. For example, the first entity in first data set this designation can be $E_1D_1$. This yields a data record triple of the format $\{E_1D_1$, Address, 101 East Main Street$\}$.

As the data record linking method uses the attributes to identify linkage points between or among data sets, the values associated with these attributes are compared to identify similarities. Value comparison is facilitated by converting the values associated with the attributes into a format that facilitates the identification of similarities among the values. In one embodiment, each value in each data record triple is converted into one or more tokens 206. Each value is a string of characters. Suitable characters include, but are not limited to, alpha-numeric characters, non-alphanumeric characters and spaces. Therefore, a given token can include an entire character string of a given value or a portion or sub-string of a given value character string. This yields one or more tokens for each value. Conversion of a given value into one or more tokens is accomplished by, for example, placing the value string into the set of tokens without changes (exact analyzer), transforming any upper case alpha-numeric character in the value string into a corresponding lower case alpha character (lower analyzer), breaking the value string into a plurality of tokens defined by the spaces in the value string (split analyzer), replacing non-alphanumeric characters with spaces (word token analyzer), breaking the value string into a plurality of tokens comprising all lowercase alpha-numeric strings of a predetermined length (q-gram analyzer) or combinations thereof.

As a given attribute in a given data record can have multiple instances or multiple values or multiple instances of a given attribute can occur in more than one data record or dataset, the tokens derived from the value or values associated with any given attribute can be grouped into token sets for a given data record or dataset 208. These token sets can be viewed as instance values of a given attribute in a given data record or given dataset. In one embodiment, a token set is created for each attribute in a given data record. Each token set of a given data record includes all tokens obtain from converting all values associated with a given attribute in the given data record into one or more tokens. Alternatively, a token set is created for each attribute in a given dataset. Each token set includes all tokens obtained from converting all values associated with a given attribute in the given data set into one or more tokens.

Attribute values are then compared across datasets 210. As the attribute values have been tokenized and the tokens group into token sets, values are compared by comparing token sets associated with attributes in different datasets. In one embodiment, the token sets of attributes are compared using a set similarity function or an information retrieval type relevance function. The goal is to identify pairs of attributes satisfying the predetermined similarity threshold based on the similarity of the values of those attributes are expressed in the token sets. Suitable set similarity functions include, but are not limited to, intersection size, Jaccard similarity coefficient, Dice's coefficient and maximum inclusion degree. Suitable information retrieval type relevance functions include, but are not limited to, cosine similarity with term frequency-inverse document frequency or Okapi BM25.

In general, tokens sets can be compared using an entire set or individual tokens. In one embodiment, an attribute in each one of a pair of datasets is selected, and the tokens sets in the data records for the selected attributes are compared by comparing all tokens in the token sets to generate an overall similarity score. A determination is then made if the overall similarity score is above the predetermined similarity threshold. Alternatively, an attribute is selected in each one of a pair of datasets. One or more tokens are selected from one of the token sets for given data records for the selected attributes. The other token set is searched on a token-by-token basis for similar tokens to each one of the selected tokens using a value similarity function and a predefined threshold. The similarity scores for all returned similar tokens are averaged, and the average similarity score is compared to the predetermined similarity threshold to see if it exceeds this threshold value.

The value or token set comparisons are used to identifying matching attributes having values that satisfy a predetermined similarity threshold 220. These matching attributes are used to identifying linkage points between pairs of datasets 240. Each linkage point links one or more pairs of data records such that each data record in each pair of data records is contained in one of a given pair of datasets, i.e., in different datasets. In addition, each pair of data records is associated with a common entity having matching attributes in the given pair of datasets. These common entities can be the same entity or related entities.

As an example, a linkage point between two data sets $D_1$ and $D_2$ is a pair of attributes $(p_1,p_2)$ such that for some attributed matching function, $f$, the following set is non-empty:

$$M_{(p_1,p_2)} = \{(r_1,r_2) | r_1 \in D_1 \land r_2 \in D_2 \land f_{(p_1,p_2)}(r_1,r_2)\}$$

M is referred to as the linkage set. The attribute matching function $f_{(p_1,p_2)}(r_1, r_2)$ returns true if the instance values of the two attributes are relevant based on a relevance function. The relevance function can be defined using a value similarity function sim( ) and threshold value $\Theta$.

In one embodiment, the following algorithm is used to identify matching pairs of attributes.

```
       Input: Data sets D₁ and D₂,
           A set similarity function f,
           A lexical analyzer l,
           A matching threshold Θ
       Output: (Ranked) list of pairs of paths (p₁, p₂)
1      for each attribute p₁ in D₁ do
2          for each attribute p₂ in D₂ do
3              score (p₁, p₂) ← f (Instances_{D₁}^l(p₁), Instances_{D₁}^l(p₂))
4          end
5      end
6      return pairs of (p₁, p₂) with score (p₁, p₂) ≥ Θ
           (in descending order of score(p₁, p₂).
```

In another embodiment, the following algorithm is used to identify matching pairs of attributes.

```
       Input: Data sets D₁ and D₂,
           A set similarity function f,
           A lexical analyzer l,
           A value similarity function sim( ),
           Value similarity threshold τ,
           Value of k for top-k search,
           Sample value set size σᵥ,
           A matching threshold Θ
       Output: (Ranked) list of pairs of paths (p₁, p₂)
1      for each attribute p₁ in D₁ do
2          Query_Set ← {Up to σᵥ random values in Instances_{D₁}^l(pₛ)}
3          for each value q in Query_Set do
4              M ← {(r₂, p₂, v)|p₂ ∈ Attr_{r₂} (D₂) ∧ v ∈ Instances_{r₂}^l(p₂)
                       ∧ sim(v, q) ≥ τ}
5              M_{topk} ← {(r₂, p₂, v) ∈ M with top k highest sim(v,q)}
6              MS ← Multiset{(p₂, sim(v, q))|∃r₂: (r₂, p₂, v) ∈ M_{topk}}
7          end
8          score (p₁,p₂) ← Average sim value for all (p₂,sim) ∈ MS
9      end
10     return pairs of (p₁, p₂) with score (p₁, p₂) ≥ Θ
           (in descending order of score(p₁, p₂).
```

The linkage points identified using the matched attributes are then filtered 260 to remove false positives in the identified linkage points. The identified linkage points can also be ranked, for example, based on the strength or degree of similarity. The linkage points can also be aggregated to cover three or more data sets or entities based on overlap. In one embodiment, filtering of the identified linkage points includes filtering linkage points having a linkage set size below a given threshold (cardinality), filtering linkage points wherein the linkage sets contain only a small percentage of records from one of the data sets (coverage) and filtering linkage points having a strength below a predetermined level (strength). This strength expresses a percentage of distinct records that appear in the linkage set. Strength can be expressed using the following equation:

$$\text{Strength}(M_{(p_1,p_2)}) = \frac{|\{1|(1, 2) \in M_{(p_1,p_2)}\}| + |\{2|(1, 2) \in M_{(p_1,p_2)}\}|}{|M_{(p_1,p_2)}| \times 2}$$

In one embodiment, the following algorithm is used to filter identified matching pairs of attributes.

```
       Input: Data sets D₁ and D₂,
           List L of linkage points with their score (p₁, p₂) with
             corresponding attribute matching
             function f( ) and lexical analyzer l,
           Sample linkage set size σₛ,
           Cardinality threshold κ,
           Smoothing cutoff limit λ,
           Coverage threshold χ,
           Strength threshold τ,
           Value of k for top-k search,
           A matching threshold Θ
       Output: (Ranked) list of pairs of paths (p₁, p₂)
1      for each pair (p₁, p₂) ∈ L do
2          M_{(p1,p2)} ← ∅
3          V ← Sample of size σₛ of Instance_{D₁}^l(p₁)
4          for each v ∈ V do
5              R₁ ← {r ∈ D₁|v ∈ Instances_{D₁}^l(p₁)}
6              R₂ ← {r₂|r₂ ∈ D₂ ∧ f_{(p1,p2)}(r₁,r₂)}
7              if |R₁| > λ then
8                  R₁ ← subset of size λ of R₁
9              end
10             if |R₂| > λ then
11                 R₂ ← subset of size λ of R₂
12             end
13             M_{(p1,p2)} ← M_{(p1,p2)} ∪ {(r₁, r₂)|r₂ ∈ R₁ ∧ r₂ ∈ R₂}
14         end
15         if strength(M_{(p1,p2)}) > τ and coverage(M_{(p1,p2)}) > χ
16             and Cardinality of both p₁ and p₂ are above κ
17         then
18             score'(p₁,p₂) ← score(p₁,p₂) × strength(M_{(p1,p2)})
19         end
20     end
21     return pairs of (p₁, p₂) with score" (p₁, p₂) ≥ Θ
           (in descending order of score(p₁, p₂).
```

The identified and filtered linkage points are then used to link data records associated with common entities across datasets 280. The links are displayed to a user 290 and are also utilized for searching data records for entities across the plurality of data sets.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for linking data records across datasets in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for linking data records across datasets, the method comprising:
    identifying a plurality of datasets, each dataset comprising at least one data record, each data record associated with an entity and comprising one or more attributes representing descriptive information for the associated entity, each attribute comprising an attribute value;
    creating a token set for each data record, each token set comprising a plurality of tokens and each token associated with one of the attributes and comprising a representation of the attribute value of the associated attribute, each token set comprising all tokens obtained from converting all values associated with a given attribute in a given data record into one or more tokens;
    comparing attributes across datasets by comparing token sets;
    identifying pairs of attributes satisfying a predetermined similarity threshold based on a similarity of attribute values determined by comparing token sets;
    using the identified pairs of attributes to identify linkage points between pairs of data records, each data record in each pair of data records contained in a different dataset in a given pair of datasets and each pair of data records associated with a common entity;
    filtering the identified linkage points to remove false positives in the identified linkage points by filtering linkage points having a linkage set size below a given threshold, filtering linkage points wherein the linkage sets contain only a small percentage of records from one of the data sets or filtering linkage points having a strength below a predetermined level, the strength comprising a percentage of distinct records that appear in the linkage set; and
    linking data records associated with common entities across datasets using the identified linkage points.

2. The method of claim 1, wherein each value comprises a value string comprising at least one of alpha-numeric characters, non-alphanumeric characters, and spaces and each token comprises at least a portion of the value string.

3. The method of claim 2, wherein creating the token set further comprises:
    converting the value string in each value into a given token by placing the value string into the given token without changes;
    transforming any upper case alphanumeric character in the value string into a corresponding lower case alpha character; and
    replacing non-alphanumeric characters with spaces or combinations thereof.

4. The method of claim 1, wherein each value comprises a value string comprising at least one of alpha-numeric characters, non-alphanumeric characters, and spaces and creating the token set further comprises converting the value string in at least one value into a plurality of tokens, each token in the plurality of token comprising at least a portion of the value string.

5. The method of claim 4, wherein converting the value string in at least one value into a plurality of tokens further comprises:
    placing the value string into the set of tokens without changes;
    transforming any upper case alpha-numeric character in the value string into a corresponding lower case alpha character;
    breaking the value string into a plurality of tokens defined by the spaces in the value string, replacing nonalphanumeric characters with spaces; and
    breaking the value string into a plurality of tokens comprising all lowercase alpha-numeric strings of a predetermined length or combinations thereof.

6. The method of claim 1, wherein the method further comprises:
    transforming each data record in each dataset into one or more data record triples, each data record triple comprising a label, an identification of a given attribute and a value for the given attribute.

7. The method of claim 6, wherein the label comprises an alphanumeric string.

8. The method of claim 6, wherein creating the token set further comprises:
    converting each data record triple into one or more tokens.

9. The method of claim 1, wherein identifying matching attributes further comprises:
    comparing the token sets of attributes using a set similarity function comprising or intersection size, Jaccard similarity coefficient, Dice's coefficient or maximum inclusion degree or an information retrieval type relevance function comprising cosine similarity with term frequency—inverse document frequency or Okapi BM25 to identify pairs of attributes satisfying the predetermined similarity threshold.

\* \* \* \* \*